June 5, 1923.  
E. W. JACKSON  
SPEED CHANGE GEAR  
Original Filed July 28, 1920  
1,457,526  
2 Sheets-Sheet 1

INVENTOR.  
ERNEST W. JACKSON  
BY White Prost & Evans  
his ATTORNEYS.

June 5, 1923.

E. W. JACKSON

SPEED CHANGE GEAR 1,457,526

Original Filed July 28, 1920   2 Sheets-Sheet 2

INVENTOR.
ERNEST W. JACKSON
BY White Prost & Evans
his ATTORNEYS.

Patented June 5, 1923.

1,457,526

UNITED STATES PATENT OFFICE.

ERNEST W. JACKSON, OF SAUSALITO, CALIFORNIA.

SPEED-CHANGE GEAR.

Application filed July 28, 1920, Serial No. 399,546. Renewed March 3, 1922. Serial No. 540,938.

*To all whom it may concern:*

Be it known that I, ERNEST W. JACKSON, a citizen of the United States of America, and a resident of Sausalito, county of Marin, and State of California, have invented a new and useful Speed-Change Gear, of which the following is a specification.

My invention relates to a speed change gear or transmission mechanism, and one of its objects is to provide means which may be applied to the driving shaft of an automobile to increase the number of speeds over the number available from standard equipment.

Another object of the invention is to provide a compact self-contained fully enclosed gear unit in which complete and constant lubrication of the working parts is assured.

My invention possesses other objects and features of advantage, some of which, with the foregoing, will be set forth in the following description of the invention. It is to be understood that I do not limit myself to the showing made by the said description as I may adopt variant forms of my invention within the scope of the claims.

Figure 1:
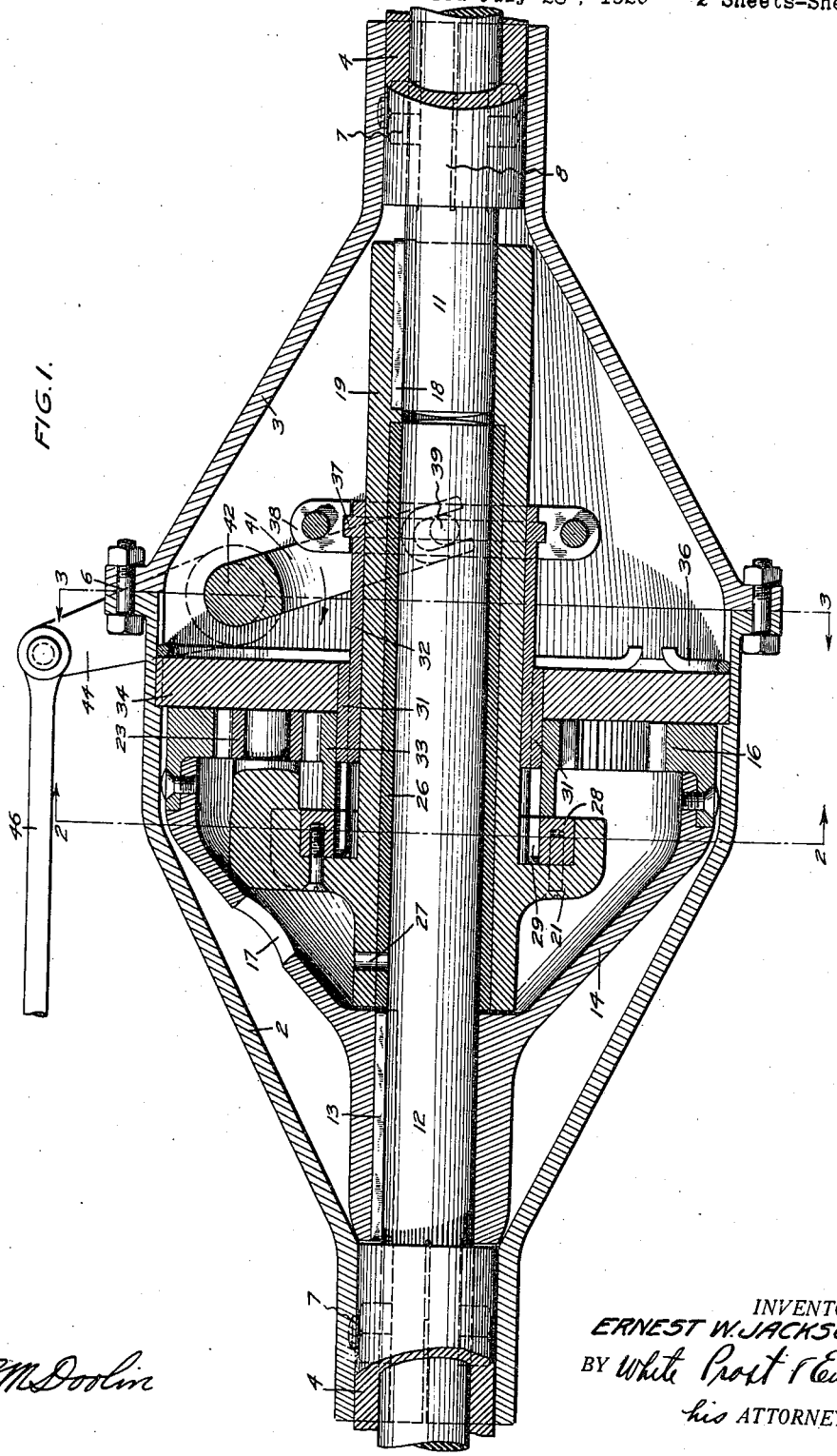
Figure 2:
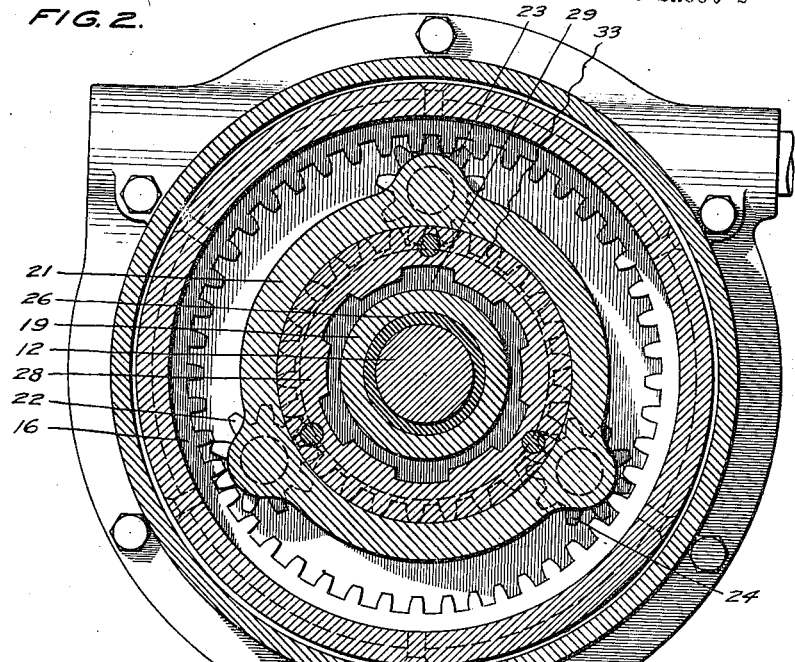
Figure 3:
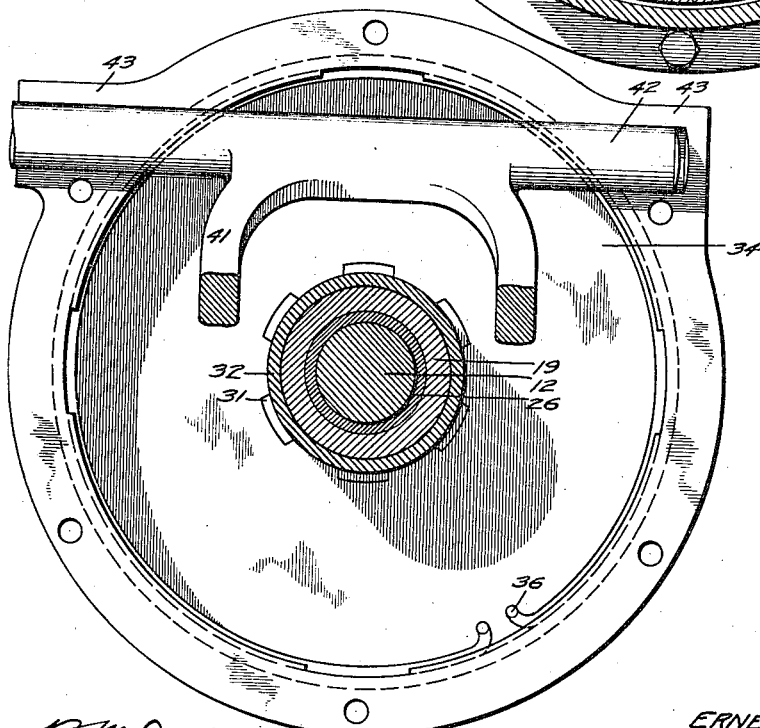

Referring to the drawings: Fig. 1 is a vertical sectional view of my transmission mechanism. Figs. 2 and 3 are vertical sectional views, the respective planes of section being indicated by the lines 2—2 and 3—3 of Fig. 1.

My transmission mechanism comprises a housing consisting of forward and rear sections 2 and 3 respectively interposed in the torque tube 4. The housing parts are secured together by bolts 6 and to the torque tube ends by bolts 7, thru laterally extending flanges 8.

In the present instance, the shaft 11, Fig. 1, was originally a part of the shaft 12 and together formed the drive shaft extending from the drive shaft pinion of the differential to the universal joint. It is assumed that this drive shaft was severed and my gearing mechanism interposed between the severed parts. A key 13 secures the shaft 12 to the bell-shaped flange 14 on which the internal gear 16 is secured. The flange is provided with an aperture 17 thru which lubricant may pass. A key 18 secures the shaft 11 to a sleeve 19 which also encloses the adjacent end of shaft 12 to preserve the alinement of the shafts. The sleeve 19 is provided with a flange 21 upon which are disposed stub shafts on which planet gears or pinions 22, 23 and 24, respectively, are rotatably mounted to mesh with the internal gear 16. The inside of the sleeve is lined with a suitable antifriction bushing 26 and the sleeve is formed with one or more apertures 27 to permit lubricant to work into the bearing. Bolted to the sleeve 19 is a hardened ring 28 provided with recesses 29 to receive similarly shaped teeth or keys 31 on the sleeve 32 which is slidably and rotatably mounted on the sleeve 19. Mounted on the sleeve 32 is a sun gear 33 the keys 31 engaging similarly formed ways in the gear, so that the sleeve is slidable but not rotatable therein. The gear 33 is in mesh with all three of the gears 22, 23 and 24. A housing plate 34 non-rotatably fixed in the housing 2 by means of suitable projections interlocking with the housing, is retained in position adjacent the gears by the stiff spring 36 which seats in a groove formed in the housing. The plate encircles the sleeve 32 and is provided with recesses, similar to the recesses 29, in which the keys 31 may be engaged. In order to move the sleeve 32 it is provided with a flange 37 which engages a suitable groove in the shifting collar 38. The collar is provided with lugs 39 for engagement with the shifting yoke 41 of the shaft 42. The shaft 42 is journaled in bearings 43 half of which are formed in each abutting edge of the housing parts 2 and 3. The shaft is turned to shift the sleeve 32 by the lever 44 which in turn is connected by a rod 46 with a suitable shifting lever convenient to the driver's hand.

It will be clear from the above that the sleeve 32 may be shifted longitudinally to any one of three positions.

(1) In locked engagement with the fixed housing plate 34, as shown in Fig. 1, thus holding the sun gear 33 stationary. In this position the rotation of the engine driven shaft 12 and internal gear 16 causes the planet gears 22, 23 and 24 to roll around the fixed sun gear, thus rotating the planet gear mounting 21 and sleeve 19 and the shaft 11 keyed thereto, at a slower speed than the shaft 12.

(2) To neutral position in which the keys 31 are free of engagement with plate 34 and ring 28 respectively;

(3) In locked engagement with the ring 28, the keys 31 engaging therein so that the sun gear is locked to the planet gear mounting 21. Since the planet gears are now prevented from turning, the planet gear mounting is locked to the internal gear 16, so that both shafts 12 and 11 turn together at the same speed.

Since the regular or primary transmission system of the automobile provides two forward speeds and one reverse speed at which the shaft 12 may be driven from the engine, say in ratios 1 to 1 and 1 to 3 for forward speeds, and 1 to 4 in reverse; and my secondary transmission provides two speeds at which the shaft 11 may be driven from the shaft 12 say in the ratios of 1 to 1 and 1 to 1½, it follows that my secondary gearing attachment provides means whereby the shaft 11 may be driven in the ratio of 1 to 1, 1 to 1½, 1 to 3 and 1 to 4½ for forward speeds, and 1 to 4 and 1 to 6 for reverse speeds. That is to say, my attachment adds to the forward speeds obtainable from the standard equipment, an intermediate speed between the present high and low and a second and lower low speed, and in reverse it adds a second and lower speed.

A suitable lubricant is placed in the forward end of the housing and finds its way to all portions of the working parts.

It is obvious that if desired the apparatus may be reversed in position, so that the shaft 11 may be driven at a speed higher than that of the shaft 12 instead of lower as in the structure just explained.

I claim:

1. In a transmission mechanism a pair of alined shafts, an internal gear fixed on one of the shafts, a sleeve fixed on the other shaft, a pinion carried by the sleeve and in mesh with the internal gear, a second gear in mesh with the pinion and a slidable member for stopping the second gear or for locking it to the sleeve carrying the pinion.

2. In a transmission mechanism the combination of an enclosing housing, a pair of alined shafts extending into the housing, an internal gear fixed on one of the shafts, a sleeve fixed on the other shaft, a plurality of pinions carried by said sleeve and in mesh with the internal gear, a second gear in mesh with the pinions and a slidable member for locking the second gear to the housing or for locking it to the sleeve carrying the pinions.

3. In a transmission mechanism the combination of an enclosing housing, a pair of alined shafts extending into said housing, an internal gear fixed on one of the shafts, a sleeve fixed on the other shaft, a plurality of pinions carried by said sleeve and in mesh with the internal gear, a second gear in mesh with the pinions, a plate fixed in the housings adjacent the gears, and a slidable sleeve for locking the second gear to said plate or for locking it to the sleeve carrying the pinions.

4. In a transmission mechanism, a driving and a driven shaft, a fixed element, a planet gear mounted on one of said shafts, a gear in mesh with said planet gear fixed on the other shaft, a second gear in mesh with said planet gear, and a slidable member fixed for rotation with said second gear and interlockable with said fixed member and with said planet gear mounting.

5. In a transmission mechanism, a driving and a driven shaft, a fixed element, a planet gear mounted on one of said shafts, a gear in mesh with said planet gear fixed on the other shaft, a second gear in mesh with said planet gear, a sleeve slidable in said second gear and fixed for rotation therewith and interlockable with said fixed member and with said planet gear mounting, and means for moving said sleeve into either of said interlocked positions.

6. In a transmission mechanism, alined driving and driven shafts, a sleeve fixed on said driven shaft and enclosing said driving shaft, a planet gear mounted on said sleeve, an internal gear in mesh with said planet gear fixed on the driving shaft, a slidable sleeve rotatably disposed on said planet gear sleeve, a housing plate fixed adjacent said gears, a second gear in mesh with said planet gear and fixed for rotation with said slidable sleeve, means on said slidable sleeve and planet gear sleeve and housing plate. whereby the slidable sleeve may be interlocked with either the planet gear sleeve or the housing plate, and means for moving said slidable sleeve into either of said interlocked positions.

7. In a transmission mechanism, a driving and a driven shaft, a fixed element, a planet gear mounted on one of said shafts, a gear in mesh with said planet gear fixed on the other shaft, a second gear in mesh with said planet gear, a sleeve slidable in said second gear and fixed for rotation therewith and interlockable with said fixed member and with said planet gear mounting, and a collar and yoke for moving said sleeve into either of said interlocked positions.

8. In a transmission mechanism, a driving and a driven shaft, a fixed element, a planet gear mounted on one of said shafts, a gear in mesh with said planet gear fixed on the other shaft, a second gear in mesh with said planet gear, a slidable member fixed for rotation with said second gear and interlockable with said fixed member and with said planet gear mounting, and a collar and yoke for moving said sleeve into either of said interlocked positions.

In testimony whereof, I have hereunto set my hand.

ERNEST W. JACKSON.